Dec. 13, 1966   LE ROY R. BOGGS   3,291,878
PRODUCTION OF FIBER REINFORCED RESIN ARTICLES
Filed Dec. 11, 1962   5 Sheets-Sheet 2

Fig. 1b

INVENTOR.
Le Roy R. Boggs
BY
Synnestvedt & Lechner
ATTORNEYS

Dec. 13, 1966   LE ROY R. BOGGS   3,291,878
PRODUCTION OF FIBER REINFORCED RESIN ARTICLES
Filed Dec. 11, 1962   5 Sheets-Sheet 3

INVENTOR.
Le Roy R. Boggs
BY
ATTORNEYS

United States Patent Office 3,291,878
Patented Dec. 13, 1966

3,291,878
PRODUCTION OF FIBER REINFORCED
RESIN ARTICLES
Le Roy R. Boggs, Bristol, Tenn., assignor to Universal
Moulded Fiber Glass Corp., Bristol, Va., a corporation
of Delaware
Filed Dec. 11, 1962, Ser. No. 243,862
8 Claims. (Cl. 264—137)

This invention relates to production of articles or pieces composed of fiber reinforced resin material and is particularly concerned with the production of pieces or articles in which the reinforcement comprises glass fibers, either in the form of mates, or rovings, or woven fabrics, or combinations of these materials.

As disclosed for example in my copending applications Serial No. 2,760, filed January 15, 1960, and refiled November 3, 1964, under Serial No. 408,488, and issued as Patent No. 3,244,784 on April 5, 1966, and Ser. No. 115,633, filed June 8, 1961, fiber reinforced resin articles of various shapes may be made by a technique in which the fiber reinforcement is first impregnated with a heat settable liquid resin and then the impregnated reinforcement is fed to the entrance end of a forming passage provided in a forming device. In the forming passage the resin is heated sufficiently to set or solidify the resin, the solidified article being engaged by a puller mechanism beyond the discharge end of the forming passage. Such puller mechanism serves to feed the materials through the system.

For a number of reasons it is difficult to produce certain types of articles according to the method just referred to, particularly where the articles are thin walled either throughout the entire cross section of the article or throughout a portion of the cross section. One difficulty which has been encountered, especially with very thin walled sections, is that the surface area in relation to the cross sectional area of the piece is so extensive as to greatly increase the ratio between the frictional resistance encountered in pulling the piece through the forming passage and the cross sectional area of the piece. In consequence the pulling force tends to break the article in the region where it is being solidified by application of heat within the forming passage. This has resulted in frequent shutdowns and the necessity for frequent restarting operations, all of which is wasteful and uneconomical.

The present invention overcomes the foregoing difficulties and also has certain additional advantages as will be explained, but before referring to such additional advantages brief reference is first made to the method provided according to the present invention. In accordance with one important aspect, the invention contemplates feeding to a forming device of the kind above referred to, a sandwich made up of a parting strip or travelling core, together with layers fo resin impregnated fiber reinforcements located at both sides of the parting strip, this sandwich being gripped by the puller mechanism beyond the discharge end of the forming passage in the forming device. In this way a plurality of pieces of thin section are simultaneously made, without reducing the overall cross section of material passing through the forming passage and on which the puller mechanism must engage and pull in order to advance the materials through the system. In addition, the presence of the parting strip in the sandwich contributes strength to the sandwich for pulling purposes, and thus largely contributes to overcoming the difficulty above mentioned.

This arrangement and technique has a number of objects and advantages going beyond that already mentioned. For instance the technique of the present invention permits multiple production from a single forming device or die, thus providing substantial economic advantages. Moreover, with various types of parting strips or separators it is possible to produce articles which are more resin rich at the surface, which is desirable for a number of reasons, including better color consistency and weather resistance.

Still further, according to the technique of the present invention it is contemplated to employ certain types of separator or parting strips which will contribute a textured surface to the articles being formed, the nature or character of the texture depending upon the type of parting strip used, as will be explained more fully hereinafter.

The technique of the present invention also makes possible production of articles in which portions only are of thin walled section. For example, a parting strip may be fed in an edge portion of reinforcement being delivered to the forming passage in order to provide a groove in the edge portion of the article, and this is practical even where the walls of the groove are very thin because of the strength contributed to the article during the forming and pulling of the article by virtue of having the parting strip present at that ime.

In accordance with still another aspect of the invention, it is contemplated to employ a travelling core element positioned either between separate reinforcements or at one side of a reinforcement, the core having grooves, ridges or any other desired special surface configurations so as to impart complementary surface configurations to the piece or pieces which are being formed while in contact with the core. This feature of the invention is usable in connection with the production of pieces of relatively thin section and is also usable regardless of the thickness of the piece being made.

In accordance with still another aspect of the invention, it is contemplated to feed a single reinforcement between a pair of travelling core elements. In this way, if desired, an exceedingly thin piece may be formed, the core elements serving to contribute such strength to the sandwich as to permit pulling of the assembly through the forming device without danger of breakage. The use of multiple travelling cores at both sides of a single reinforcement may also be utilized in connection with the production of thick pieces, for instance in instances where it is desired to produce grooves, ridges or other surface configurations on the single piece being formed, for which purpose complementary ridges and grooves, or the like are provided on the travelling core elements.

How the foregoing objects and advantages are attained will appear more fully from the following description referring to the accompanying drawings, in which:

FIGURE 2 is a view on a reduced scale of a modified arrangement utilizing a parting strip in the form of a discontinuous element which is fed between a pair of reinforcements in order to produce two thin articles as in FIGURES 1a and 1b;

Figure 1:
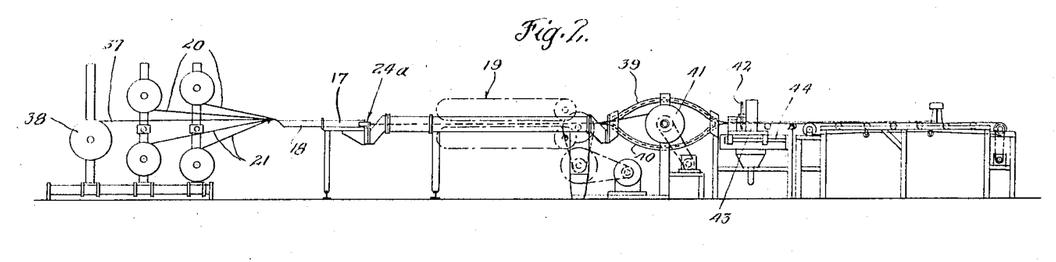
FIGURES 1a and 1b make up a side elevational view, with parts shown somewhat diagrammatically, of one embodiment of the invention in which a parting strip or travelling core in the form of a closed loop is employed, providing for the production of a pair of thin sectioned pieces or articles.
Figure 1A:
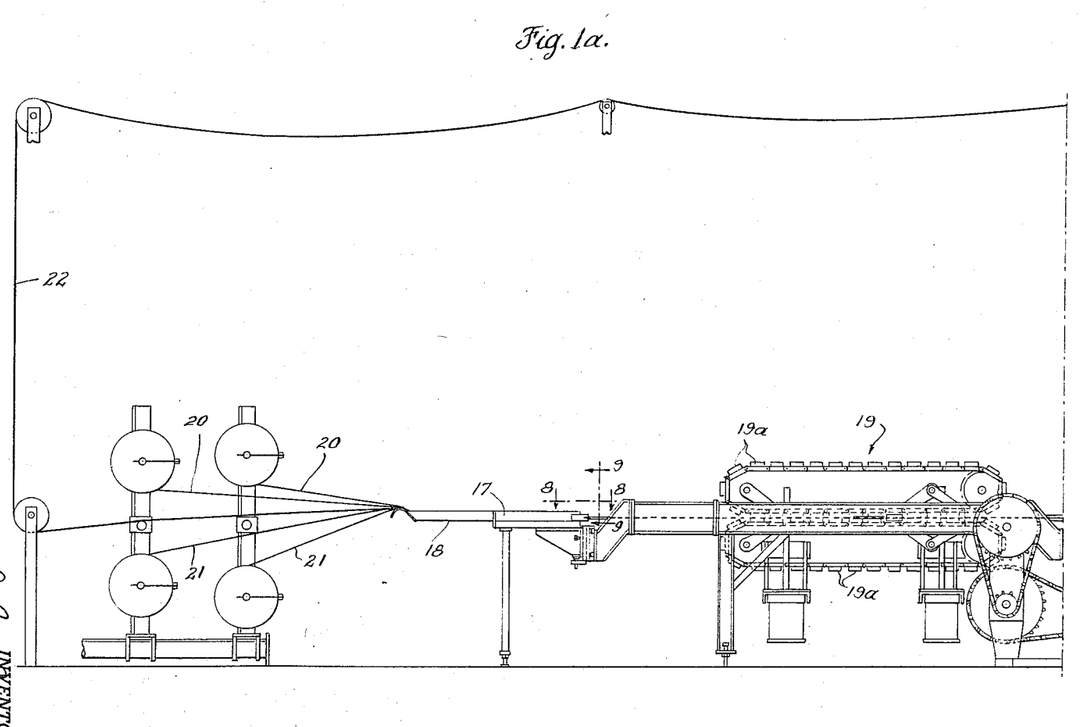
Figure 1B:
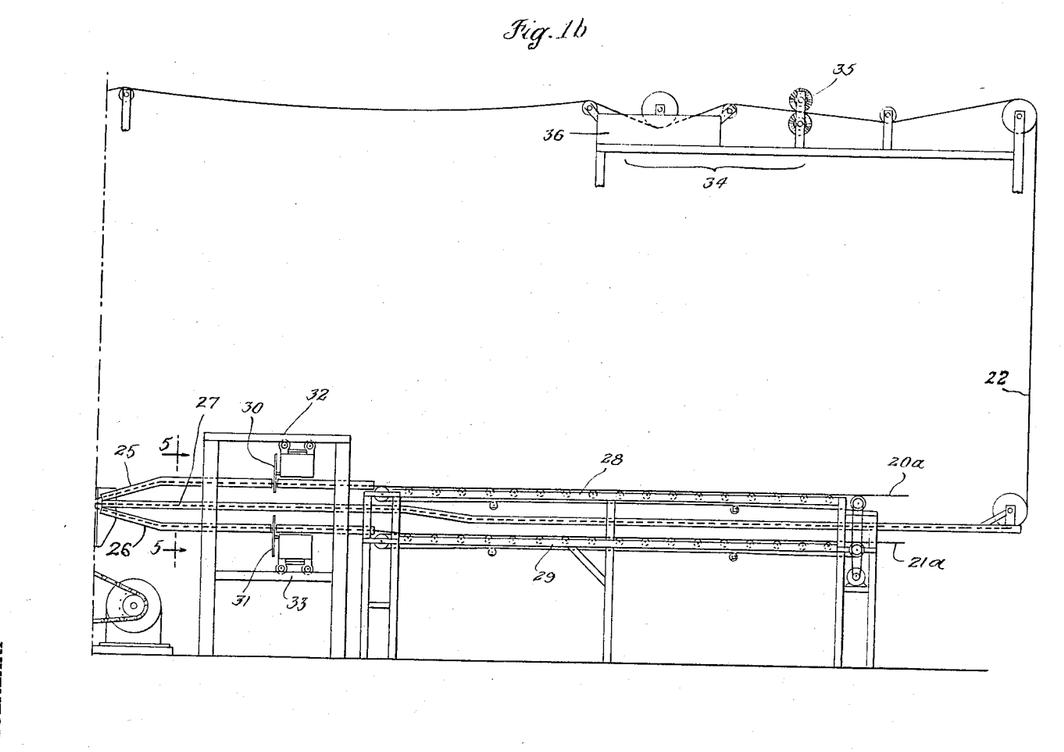

Turning now to the embodiment of FIGURES 1a and 1b, the forming device is shown in FIGURE 1a at 17. This device may be of the kind disclosed in my copending applications Serial Nos. 2,760 and 115,633 above mentioned and 138,350, filed September 15, 1961. The forming device has a forming passage therein having a cross sectional shape conforming with the combined cross section of the plurality of articles to be formed, and as in the copending applications referred to, the forming passage is preferably provided with a tapered entrance portion and has associated therewith a cooling system. Moreover, the forming passage includes a portion of uniform cross section having associated therewith heater means by means of which the resin material is cured or solidified before the articles are delivered from the discharge end of the forming device. In advance of the forming device 17 there is a resin reservoir or pan 18 in which the fiber reinforcements to be employed are impregnated with the resin material to be used in liquid stage, for instance a polyester resin of the laminating type containing a hardener such as benzol peroxide in an amount equal to about 1%.

The tapered entrance end of the forming passage is directly exposed to the resin in the resin bath and the cooling means associated with this part of the forming device serves to avoid premature cooling and solidification of the resin in the tapered entrance end portion of the forming passage and also in the adjoining resin pan. Beyond the discharge end of the forming device 17 a puller mechanism 19 is provided, this mechanism desirably being of the crawler tread type, for instance as shown in my copending applications Serial No. 115,633 above referred to and 142,749, filed September 18, 1961, and issued October 6, 1964, as patent No. 3,151,354. This crawler tread mechanism grips the solidified or formed articles beyond the discharge end of the forming device and pulls the materials into and through the system.

In accordance with the present invention, instead of proportioning the forming passage in the forming device 17 to conform with the cross section of a single article, the forming passage in the forming device is shaped to conform with the total cross section of a plurality of articles being simultaneously formed. Thus, in the embodiment of FIGURES 1a and 1b, two strips of fiber reinforcement, preferably glass fiber mats 20 are fed to the system in order to form the reinforcement in one article and two similar strips of fiber reinforcement 21 are fed into the system in order to form the reinforcement in a second article. Between the reinforcements 20 and 21 a travelling core or parting strip 22 is fed, all of the strips 20, 21 and 22 being directed through the liquid resin in the reservoir 18 and thence into the entrance end of the forming passage in the forming device 17, in the manner of a sandwich. In the forming passage which, for example, may take the cross sectional shape indicated in FIGURES 4 and 9, the parting strip 22 divides the upper article 20a from the lower article 21a. In this embodiment, however, the parting strip 22 is of width slightly less than the width of the forming passage and thus of the articles being formed, so that the resin material of the two articles flows around the edges of the parting strip and interconnects or joins the two articles at the edges. It will also be noted that with the particular articles being formed in accordance with FIGURES 4, 5, 8, 9 and 10, each article is provided with a grooved part 23 at one edge thereof. A sheet or strip in this form is particularly adapted for use as a siding board, to be laid up on a wall of a building generally in the manner of clapboard.

Figure 4:
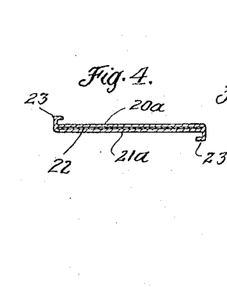
FIGURE 4 is a sectional view of the articles being formed in accordance with the illustration of FIGURES 1a and 1b, this view showing the articles as they would appear within the forming passage, prior to separation of the articles and of the parting strip employed.
Figure 5:
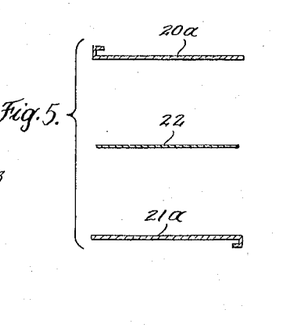
FIGURE 5 is a view of the separated articles and parting strip taken in the region indicated by the section line 5—5 on FIGURE 1b.
Figures 11, 12, 13, 14, 15:
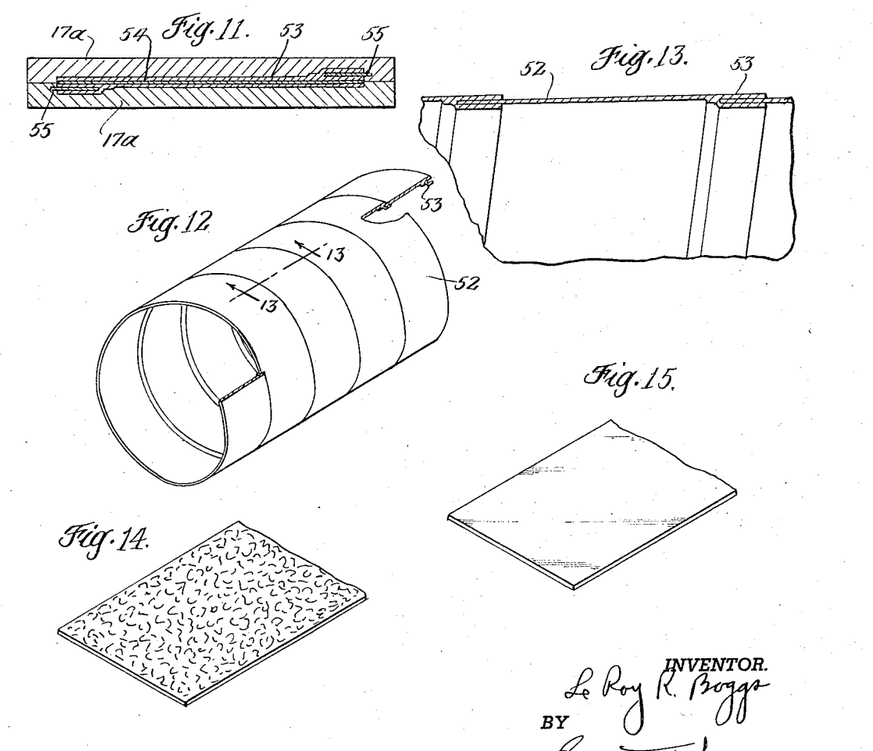
FIGURE 11 is a view of a modification of the forming device and parting strips which may be used, for instance in a machine of the kind shown in FIGURES 1a or 1b or of the kind shown in FIGURE 2, in order to provide for the production of another type piece.
FIGURE 12 is a view illustrating an ultimate article made from a piece of the kind being formed in accordance with the illustration of FIGURE 11.
FIGURE 13 is a sectional, detailed fragmentary view on an enlarged scale, taken as indicated by the section line 13—13 on FIGURE 12.
FIGURE 14 is a fragmentary view of an article or sheet made in accordance with certain embodiments of the invention, and having a textured surface.
FIGURE 15 is a view similar to FIGURE 14 but illustrating a similar sheet or article made according to the invention but having a smooth surface.

Turning again to the mechanism shown in FIGURES 1a and 1b, it is mentioned that the puller blocks 19a of the puller mechanism are shaped to engage with the flat portion of the sandwich as shown in FIGURE 4, without engagement with the grooved parts 23. As the sandwich of FIGURE 4 is drawn from the discharge end of the forming device 17, the articles are desirably slit apart, for instance by means of slitting knives 24 which are mounted at the edges of the sandwich and slit the resin interconnection at the edges of the parting strip 22 in order to separate the two articles. It will be observed that these slitting knives are located between the discharge end of the forming device and the puller mechanism. In this way the slitting knives operate in a region in which the articles are under tension as a result of the pull by the puller mechanism.

Where the formed articles and the intervening parting strip are delivered from the puller mechanism (see FIG- URE 1b) guide devices are provided for separating the formed articles from the parting strip. This separation is shown in FIGURE 5, and in FIGURE 1b such guides are indicated at 25, 26 and 27, the guides 25 and 26 engaging the two articles 20a and 21a and the guide 27 engaging the parting strip 22. Roller type support tables 28 and 29 are provided respectively for the upper and lower articles 20a and 21a and after a desired predetermined length has been delivered onto these tables, cut-off discs 30 and 31 are brought into operation in order to cut off the formed pieces and thus form lengths thereof of the desired dimension. The cut-off discs 30 and 31 are advantageously movably mounted on guides or supports 32 and 33, so that the cut-off operation may be performed while the articles are actually travelling, thereby avoiding the necessity of stopping the production operation for cut-off purposes. The parting strip, which is in the form of a closed loop, is guided to a cleaning station indicated in FIGURE 1b at 34 and comprising cleaning brushes such as shown at 35 and also a washing bath 36. From the washing bath the parting strip is returned to the input side of the system and again reenters the forming device between the appropriate reinforcements being employed for forming the articles. In connection with the equipment and the operation just described it should be noted that the use of the parting strip enables the production of articles of much thinner section than has been practicable heretofore by a continuous system of the kind referred to. It should also be noted in connection with the embodiment of FIGURES 1a and 1b, 4, 5, 8, 9 and 10 that the parting strip or travelling core there employed is assumed to be formed of smooth, thin, flexible steel strip, for instance of about 0.15 inch in thickness. It should be understood, however, that parting strips made of other materials may be used in an arrangement such as shown in FIGURES 1a and 1b, for instance the parting strip may be made of resin materials including, for example, cellophane, and it is also to be kept in mind that parting strips made of various materials may have textured rather than smooth surfaces, in which event the texture of the parting strip will be reproduced upon the engaged surface of the article being formed. In the event of employment of certain thin films, for instance cellophane, which has relatively low transverse rigidity, the effect on the surface of the articles being made is to impart thereto a rippled or crinkled surface as represented somewhat diagrammatically on the surface of the strip shown in FIGURE 14. By way of contrast a strip or article having a smooth surface is indicated in FIGURE 15, such smooth surfaced articles being producible with smooth surfaced parting strips, especially metal strips.

As an example of a textured type of material parting strip, reference is made to quilted aluminum foil which may be employed to produce a similar effect upon the surface of the articles in engagement of such quilted aluminum foil.

Figure 16:
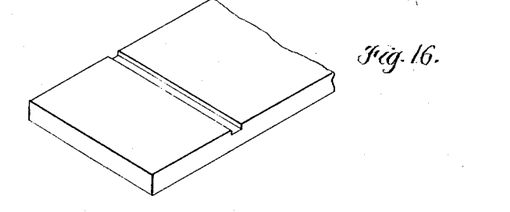
FIGURE 16 is a view similar to FIGURES 14 and 15 but illustrating still another type of article made in accordance with the present invention and having transverse grooves formed therein, in a manner which will be described more fully hereinafter.

The parting strip may even be provided with transverse ribs, in which event the article produced will be provided with transverse grooves, for instance as indicated in FIGURE 16. This feature may be used not only with articles of relatively thin section but also with articles of relatively thick section, as is also indicated in FIGURE 16. Thus it will be seen that certain aspects of the invention are advantageously applicable not only to pieces of thin section but also to pieces of thicker section. This is also true with respect to production of articles having a textured surface. A specific method for making an article of the kind shown in FIGURE 16 is described hereinafter with reference to FIGURES 17 and 18.

In the embodiment illustrated in FIGURE 2 it is also assumed that sheet or strip type of articles are being produced. As in FIGURES 1a and 1b, a pair of reinforcements 20 are fed to make up one article and another pair 21 to make up another article in FIGURE 2, however, instead of employing a parting strip in the form of a continuous or endless loop, the parting strip 37 is discontinuous, being fed from a spool or reel 38 between the reinforcements 20 and 21 through the resin pan 18 and the forming device 17, the sandwich being pulled from the discharge end of the forming device by a puller mechanism 19 as in FIGURE 1a.

In the embodiment of FIGURE 2 guide devices 39 and 40 separate the formed articles, for instance after being slit adjacent the exit end of the forming device by slitter mechanism generally indicated at 24a. The guides 39 and 40 separate the two articles being formed sufficiently to accommodate a windup reel 41 for the parting strip 37, and the guides 39 and 40 then again bring the two formed articles together so that they may be conjointly cut off by the cut-off disc 42 adapted to travel with the articles by means of a carriage 43 mounted upon the trackway 44.

In many respects the arrangement of FIGURE 2 is similar to that of FIGURES 1a and 1b although here provision is made for using a parting strip or travelling core which is discontinuous, rather than continuous. Such a system for handling a discontinuous parting strip may be employed in certain instances where the parting strip is used only once and then discarded, for instance a thin cellophane film. On the other hand this system may also be employed where the parting strip is to be reused, for instance a metal strip, in which event it may be necessary to reclean the strip before mounting the reel thereof at the input position indicated at 38.

Figure 3:
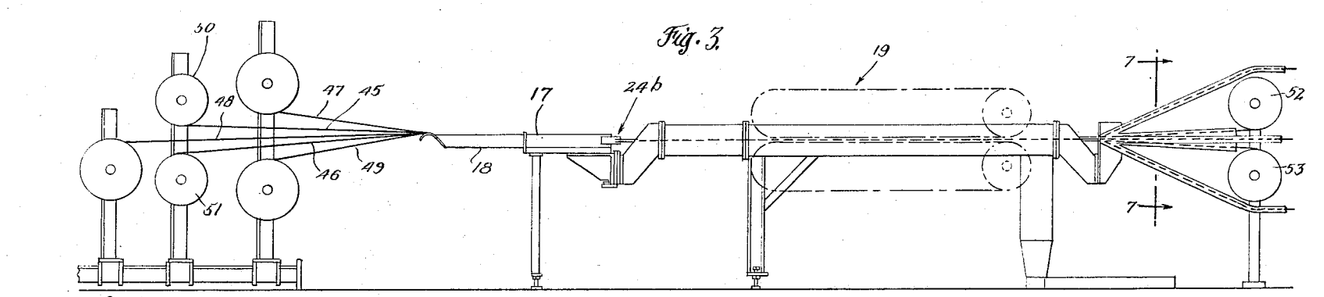
FIGURE 3 is a view on an enlarged scale of an arrangement for producing three articles, and having two parting strips provided.

Still another embodiment is shown in FIGURE 3. The equipment here shown is arranged to provide for the production of three articles interleaved with two parting strips, in the manner of a multiple layer sandwich. Thus, parting strips 45 and 46 are interleaved with reinforcements 47, 48 and 49, in order to provide three articles 47a, 48a and 49a (see also FIGURES 6 and 7).

Figure 6:
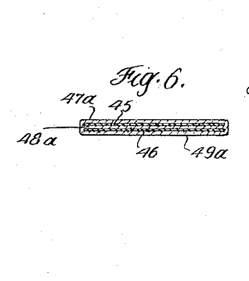
FIGURE 6 is a view similar to FIGURE 4 but illustrating in cross section the articles being formed in the arrangement of FIGURE 3, the view representing those articles as they would appear cross sectionally within the forming passage.
Figure 7:
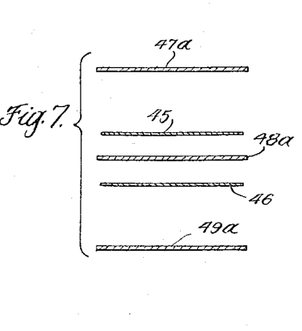
FIGURE 7 is a view of the separated articles and parting strips of FIGURE 6, this view being taken in the region indicated by the section line 7—7 on FIGURE 3.
Figures 8, 9, 10:
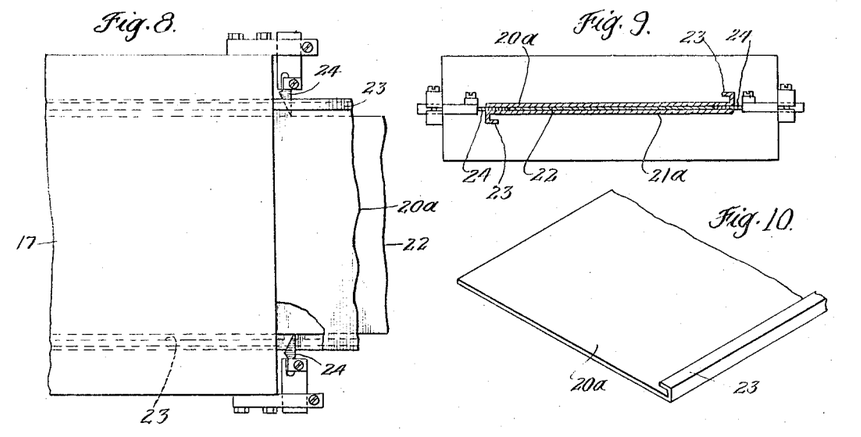
FIGURE 8 is a view taken as indicated by the section line 8—8 on FIGURE 1a, showing a form of slitting mechanism employed for separating the articles being formed in the machine of FIGURES 1a and 1b.
FIGURE 9 is a transverse view taken in the plane indicated by the line 9—9 on FIGURE 1a, also showing the slitting mechanism.
FIGURE 10 is a fragmentary isometric view of one of the pieces or articles formed in accordance with the embodiment of FIGURES 1a–1b, 4, 5, 8 and 9.

The reinforcements and the parting strips are fed through the resin pan again indicated at 18 in FIGURE 3 and thence into the entrance end of the forming passage of the forming device 17, the cross section of the sandwich in the forming passage being indicated in FIGURE 6. Here again the parting strips are of width slightly less than that of the forming passage, so that the articles are joined at the edges and multiple slitting mechanism of the general type shown in FIGURES 8 and 9 is located at the discharge end of the forming device 17, as indicated at 24b in FIGURE 3, thereby providing for slitting and separation of the several articles and the parting strips. The multiple sandwich is drawn through the system by the puller mechanism 19 and separation of the various layers occurs beyond the puller mechanism by means of guide devices, such separation being indicated in FIGURE 7 which shows the formed pieces and parting strip as taken on the section line 7—7 on FIGURE 3.

As in FIGURE 2, the parting strips employed in FIGURE 3 are discontinuous, being fed from reels 50 and 51 and being wound up on reels 52 and 53. Appropriate arrangements, for instance of the types shown in FIGURES 1b and 2 may be employed for the purpose of cutting off articles shown in FIGURE 3 to the desired lengths.

Another type of article advantageously produced in accordance with the technique of the present invention is shown in FIGURES 11, 12 and 13. In FIGURE 11 there is shown in cross section a forming device composed of upper and lower parts 17a—17a cooperating to provide a cavity in which a pair of articles may be made having the cross sectional shape illustrated in FIGURE 13. This article comprises a strip 52 having at one edge thereof a grooved part 53. The completed strip of this kind may be helically wound upon a form or mandrel in the manner indicated in FIGURE 12, with one edge of the strip 52 received in the grooved edge 53 and desirably secured therein, for instance adhesively. In this manner a conduit may be made up.

In producing a pair of such strips, appropriate fiber reinforcements are fed into a forming passage provided in the forming device 17a—17a, along with a central parting strip 54 of width equal to that of the forming passage, thereby providing for the formation of two separate articles not requiring slitting as in FIGURES 1a–1b, 2 and 3. In the embodiment illustrated in FIGURE 11, additional parting strips 55 are fed along with the fiber reinforcements in positions adapted to form the grooves of the grooved parts 53 of the articles being made. Upon emergence of this compound sandwich from the forming device, for instance at a point beyond the puller mechanism such as shown at 19 in FIGURES 1a, 2 and 3, the two articles are separated from each other and the parting strip 54 reused if desired, and in addition the strips 55 are removed from the edge grooves of the articles, such strips also being reused. Indeed, in a manner similar to that illustrated in FIGURES 1a and 1b, if desired, the parting strips 54 and 55 may comprise continuous loops.

In the embodiment of FIGURE 11, the use of the strip 55 is illustrative of one embodiment of the technique of the invention where the travelling core feature is employed to define a cavity within a given article, rather than to provide a plane of separation between two separate articles. Here again either smooth or textured parting strips or travelling cores may be employed and in addition they may be provided with transverse ribs or grooves adapted to produce complementary indentations or projections.

For producing an article of the type shown in FIGURES 11 to 13, the parting strip 54 may either be a metal strip or if desired a strip made of a resin material, and this is true also of the strips indicated at 55.

In will be noted that the parting strips 55 of FIGURE 11 project into recesses formed in the die parts 17a and 17a. This expedient is employed in order to assist in accurate positioning of the strips 55 and thus accurate formation of the grooves in the edges of the articles being formed.

Figure 17:
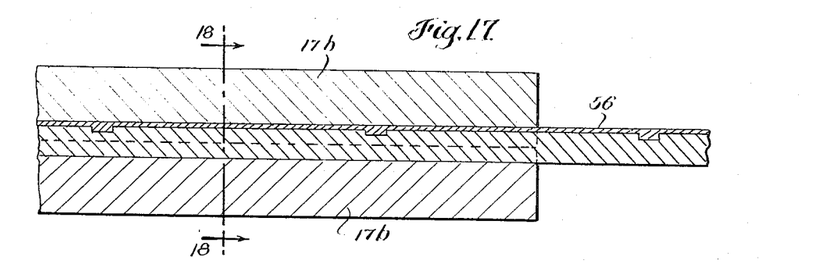
FIGURE 17 is an illustration of one embodiment of an apparatus for producing an article of the type shown in FIGURE 16, this figure showing a portion of the forming device in longitudinal section.
Figure 18:
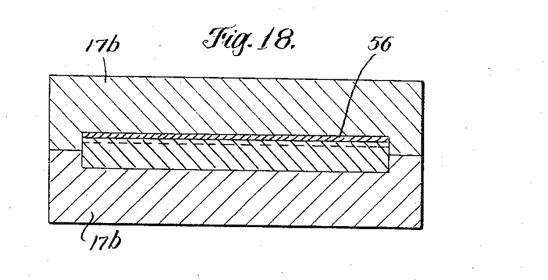
FIGURE 18 is a transverse sectional view taken as indicated by the line 18—18 on FIGURE 17.

Turning again to the type of product illustrated in FIGURE 16, it is pointed out that such an article may be made not only by employing a ribbed parting strip fed between two articles being formed, but also by the alternative technique illustrated in FIGURES 17 and 18. As here shown, the travelling core or strip member 56 is fed into the passage in the forming device 17b—17b, i.e., from the left to the right as viewed in FIGURE 17 along with the impregnated fiber reinforcement, the strip 56 being positioned against a wall of the forming passage, rather than between a pair of impregnated reinforcements adapted to ultimately form two separate articles. Upon heating of the resin in the forming device, the article is solidified in a form having transverse grooves as plainly seen in FIGURES 16 and 17, and as the article and strip 56 emerge from the discharge end of the forming device, i.e., at the right of FIGURE 17, it is contemplated that both the strip and the article will be gripped by the puller mechanism, such as the crawler tread device 19 of various figures above described. Upon delivery from the puller mechanism the strip 56 and the article would of course be separated whereupon the strip may be reused.

In the manner just described any type of ridges or grooves or other surface irregularities may readily be applied to one face of an article being formed, the transverse grooves of FIGURES 16 and 17 being shown merely by way of illustration.

Figure 19:
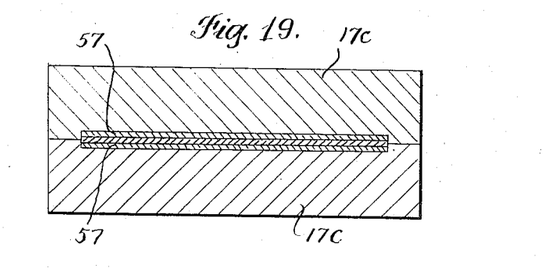
FIGURE 19 is a transverse sectional view through a forming device and certain traveling core or strip elements arranged for the production of articles of exceptionally thin section.

In instances where exceptionally thin articles are desired, an arrangement of travelling core or strip elements as shown in FIGURE 19 is contemplated. In this embodiment, which represents a transverse section through a forming device comprising separable parts 17c and 17c, a pair of travelling strips 57 are fed at the surface of the forming passage, with a layer of impregnated fiber reinforcement therebetween. This sandwich provides, in effect, a travelling mold for a thin strip in which the resin is heated as it passes through the forming passage of the forming device 17c—17c. Here again it is contemplated that the sandwich be engaged by the puller mechanism beyond the discharge end of the forming device, and upon delivery from the puller mechanism the strips 57 are separated from the thin walled article formed and either wound up for reuse or directly fed back to the input side of the system.

An arrangement similar to that shown in FIGURE 19 may also be utilized for the purpose of producing textured surfaces at both sides of a piece, regardless of its thickness and, indeed, may be employed in order to produce not only textured surfaces but also otherwise specially formed surfaces such as grooved surfaces of the kind shown for example in FIGURE 16. Thus if it be desired to provide grooves or ridges on both sides of a piece, regardless of its thickness, the travelling core or strip elements may be fed in a sandwich with the impregnated fiber reinforcement disposed between the two core elements.

Because of the presence of the parting strip or travelling core element in all of the embodiments described above, there is much less danger of breakage and consequent interruption in production, because of the strength contributed to the reinforcement and other article or articles being made by the core strip. Therefore even when producing pieces of exceedingly thin section, the breakage problem is greatly diminished. In addition it should be noted that whenever articles are being produced having contoured surfaces, i.e., with ridges, indentations, beads or the like, the increase in surface area of the product resulting from such contours need not result in increase in resistance to travel of the materials through the forming passage, because such contoured effects may be produced by engagement of a surface of the piece being made with a contoured surface of a travelling core strip which, according to the particular embodiment used, may either lie between a pair of articles or between an article and a wall of the forming device. In either event the frictional resistance of the whole assembly in the forming passage is kept at a minimum. This factor, together with the strength of the parting strip or travelling core itself greatly diminishes interruptions in production as a result of breakage even when producing articles of very thin section and/or complicated cross sectional or longitudinal contours.

With further reference to the matter of producing articles having various contoured or shaped surfaces, it is to be noted that by using highly flexible parting or travelling core strips it is possible to employ such strips in operations utilizing a forming passage having a shaped cross sectional contour, for instance a forming passage shaped to produce corrugated sheets or channel pieces. In this event the flexible core strip is fed either between separate reinforcements or at one side of a reinforcement in position to contact one wall of the forming passage, and the core strip and reinforcement sandwich is flexed in advance of the entrance end of the forming passage or as it is being fed into the forming passage. The article or articles, together with the travelling core strip are of course engaged by the puller mechanism, as in other embodiments illustrated and described, and after delivery from the puller mechanism the sandwich is separated. With highly flexible travelling core strip, for instance a strip made of resin material such as polytetrafluoroethylene or polyester, it is even possible to again flatten out the core strip either for the purpose of winding it on a spool or for the purpose of feeding it over guides, so that the strip may be taken back to the entrance end of the system and reused.

In a typical starting procedure with the various embodiments of the present invention, the fiber reinforcement to be employed and the travelling core strip or strips are threaded through the system including the resin reservoir forming passage and the puller mechanism, with the reinforcement dry so to speak, i.e., not impregnated with the liquid resin to be employed. After the dry sandwich or assembly has been threaded, the mold is then heated to resin curing temperature. Preferably at that time the resin is poured into the resin pan and the puller mechanism started. Because of the presence of the parting or core strip or strips, the strength of the dry sandwich or assembly initially threaded through the system is sufficient to enable initiation of the operation without breakage of the reinforcement. As the motion of the materials commences in response to operation of the puller mechanism the now impregnated fiber reinforcement enters the forming passage and the resin material is cured or solidified therein, and in due course the puller mechanism engages the solidified product and the production operation is established.

Because of the use of the travelling core or parting strip or strips it is not necessary, as with certain of the prior operations of this general type, to initially utilize a woven type of reinforcement in place of glass fiber mats or the like for the purpose of initiating the operation. Where the mat type of fiber reinforcement comprises the material being used in the articles to be made, that same material, namely the random fiber mats may be initially threaded through the system along with the parting strip or travelling core and the strength of the core will contribute the strength required for initiating the operation.

I claim:

1. A method for making articles of fiber reinforced resin material, comprising impregnating a fiber reinforcement with heat settable liquid resin material, feeding the impregnated fiber reinforcement through a forming passage of small thickness compared to its width, feeding a travelling core strip through said forming passage along with the impregnated fiber reinforcement in position to span the width of the forming passage and form a channel conforming in cross section with that of an article to be formed, heating the resin material in the forming passage sufficiently to solidify it, gripping the solidified article together with the core strip beyond the discharge end of the forming passage and pulling on the article and strip to advance the materials through the system, and separating the formed article from the core strip after delivery thereof from the gripping and pulling mechanism.

2. A method according to claim 1 in which a plurality of core strips are fed, one at each side of the impregnated reinforcement in the manner of a sandwich, and in which said sandwich is gripped and pulled to advance the materials through the system.

3. A method for making thin walled fiber reinforced resin articles, comprising impregnating fiber reinforcement with a heat settable liquid resin material, delivering two layers of such impregnated fiber reinforcement into the entrance end of a forming passage of small thickness as compared to its width, delivering a parting strip into the entrance end of the forming passage between the two layers of impregnated fiber reinforcement in the manner of a sandwich and in position to span the width of the forming passage and divide the forming passage into separate channels each conforming in cross section with that of an article to be formed, heating the resin material while in the forming passage sufficiently to solidify the resin material, feeding the impregnated fiber reinforcement into and through the forming passage by gripping and pulling on the sandwich beyond the discharge end of the forming passage, and separating the fiber reinforced resin articles formed at opposite sides of the parting strip, and thus provide for formation of a plurality of separate thin walled fiber reinforced resin articles.

4. A method for making thin walled fiber reinforced resin articles, comprising impregnating fiber reinforcement with a heat settable liquid resin material, delivering at least three layers of such impregnated fiber reinforcement into the entrance end of a forming passage, delivering parting strips into the entrance end of the forming passage between adjacent layers in the manner of a multiple layer sandwich and in position to transversely span the forming passage and divide the forming passage into separate channels each conforming in cross section with the cross section of an article to be formed, heating the resin material while in the forming passage sufficiently to solidify the resin, feeding the impregnated fiber reinforcements into and through the forming passage by gripping and pulling on the sandwich beyond the discharge end of the forming passage, and separating the fiber reinforced resin articles formed between the parting strips, and thus provide for formation of a plurality of separate thin walled fiber reinforced resin articles.

5. A method according to claim 4 in which a pair of adjacent parting strips are provided with textured surfaces at adjacent sides thereof to provide for formation of an article therebetween having textured surfaces on two opposite side faces.

6. A method for making articles of fiber reinforced resin material, comprising impregnating a fiber reinforcement with heat settable liquid resin material, forming an assembly of the impregnated reinforcement and a traveling strip with the reinforcement and strip in side by side relation, the side of the traveling strip presented toward the reinforcement being contoured to thereby impart a complementarily contoured surface to the article being made, feeding said assembly through a forming passage, heating the resin material in the forming passage sufficiently to solidify it and thus form a solidified article comprising fiber reinforced resin material having said complementarily contoured surface at one side thereof, the feeding of the assembly through the forming passage being effected by gripping and pulling on the assembly at opposite sides thereof beyond the discharge end of the forming passage, and separating the formed article from the traveling strip.

7. A method according to claim 6 in which two fiber reinforcements are impregnated, are assembled with the traveling strip at opposite sides thereof, and are fed through the forming passage to thereby form two articles.

8. A method for making articles of fiber reinforced resin material, comprising impregnating two fiber reinforcements with heat settable liquid resin material, positioning a parting strip between the reinforcements in the manner of a sandwich and feeding the sandwich through a forming passage, with the edge of the parting strip spaced from one edge of the forming passage, heating the resin material in the forming passage sufficiently to solidify it and thus form two solidified fiber reinforced resin articles interconnected with each other in the space between the edge of the parting strip and the forming passage and each article, the feeding of the sandwich of solidified articles and parting strip through the forming passage being effected by gripping and pulling on the sandwich at opposite sides thereof beyond the discharge end of the forming passage, slitting the interconnection between the articles, and separating the formed articles from the parting strip after the slitting.

References Cited by the Examiner

UNITED STATES PATENTS

| | | | |
|---|---|---|---|
| 259,850 | 6/1882 | Gray | 264—137 |
| 368,591 | 8/1887 | Jones | 264—149 |
| 1,074,915 | 10/1913 | Werner | 264—284 |
| 2,070,023 | 2/1937 | Olsen | 264—297 XR |
| 2,187,294 | 1/1940 | Young | 264—297 XR |
| 2,484,965 | 10/1949 | Slaughter | 264—149 |

(Other references on following page)

UNITED STATES PATENTS

| | | | |
|---|---|---|---|
| 2,485,238 | 10/1949 | Hickock | 264—297 |
| 2,526,634 | 10/1950 | Chavannes | 264—264 |
| 2,561,569 | 7/1951 | Flynn | 264—149 |
| 2,688,774 | 11/1954 | Malinowski | 264—137 |
| 2,742,388 | 4/1956 | Russell | 156—289 XR |
| 2,748,048 | 5/1956 | Russell | 156—289 XR |
| 2,822,575 | 2/1958 | Imbert et al. | 156—289 XR |
| 2,852,811 | 9/1958 | Petriello | 264—213 XR |
| 2,883,315 | 4/1959 | Palmquist | 264—146 |
| 2,871,911 | 2/1959 | Goldsworthy | 156—380 |
| 2,990,309 | 6/1961 | Wahl et al. | 156—289 XR |
| 2,970,619 | 2/1961 | Kohler | 156—380 |
| 3,159,516 | 12/1964 | Harris | 264—264 |

ROBERT F. WHITE, *Primary Examiner.*

ALEXANDER H. BRODMERKEL, *Examiner.*

R. B. MOFFITT, M. R. DOWLING, *Assistant Examiners.*